United States Patent [19]
Jang

[11] Patent Number: 5,587,717
[45] Date of Patent: Dec. 24, 1996

[54] MANUAL ANTENNA ALIGNMENT APPARATUS AND METHOD FOR VERY SMALL APERTURE TERMINAL

[75] Inventor: Yong J. Jang, Kyoungki-do, Rep. of Korea

[73] Assignee: Hyundai Electronics Industries Co., Ltd., Rep. of Korea

[21] Appl. No.: 526,890

[22] Filed: Sep. 12, 1995

[30] Foreign Application Priority Data

Dec. 30, 1994 [KR] Rep. of Korea ................ 94-39847

[51] Int. Cl.⁶ .............................................. H01Q 3/00
[52] U.S. Cl. .............................................. 342/359
[58] Field of Search ...................................... 342/359

[56] References Cited

U.S. PATENT DOCUMENTS

| | | | |
|---|---|---|---|
| 4,696,053 | 9/1987 | Mastriani et al. | |
| 4,725,843 | 2/1988 | Suzuki et al. | 342/359 |
| 4,796,032 | 1/1989 | Sakurai et al. | 342/359 |
| 5,019,833 | 5/1991 | Nonaka | 343/840 |
| 5,077,561 | 12/1991 | Gorton et al. | 342/359 |
| 5,376,941 | 12/1994 | Fukazawa et al. | 342/359 |
| 5,471,219 | 11/1995 | Rodeffer et al. | 342/359 |

Primary Examiner—Theodore M. Blum
Attorney, Agent, or Firm—Merchant, Gould, Smith, Edell, Welter & Schmidt

[57] ABSTRACT

An apparatus and a method for manually aligning an antenna of a very small aperture terminal with a satellite. The apparatus comprises a manual antenna alignment circuit connected between a demodulator and a data processor in a receiver. The manual antenna alignment circuit includes a peak value detection circuit for filtering and differentiating an output signal from the demodulator to detect a peak value therefrom, a sample/holder for sampling and holding an output signal from the peak value detection circuit, an inverter for inverting a multiplexing control signal, a first analog switch for selectively transferring an output signal from the sample/holder in an antenna alignment mode in response to an output signal from the inverter, a second analog switch for selectively transferring an output signal from an automatic gain control circuit in the receiver in a normal mode in response to the multiplexing control signal, a scaling circuit for scaling the signal transferred by the first analog switch or the signal transferred by the second switch at a desired ratio, a display circuit for displaying a level of an output signal from the scaling circuit so that it can be observed by the user with the naked eye, and an antenna alignment mode switch for selecting the antenna alignment mode.

3 Claims, 1 Drawing Sheet

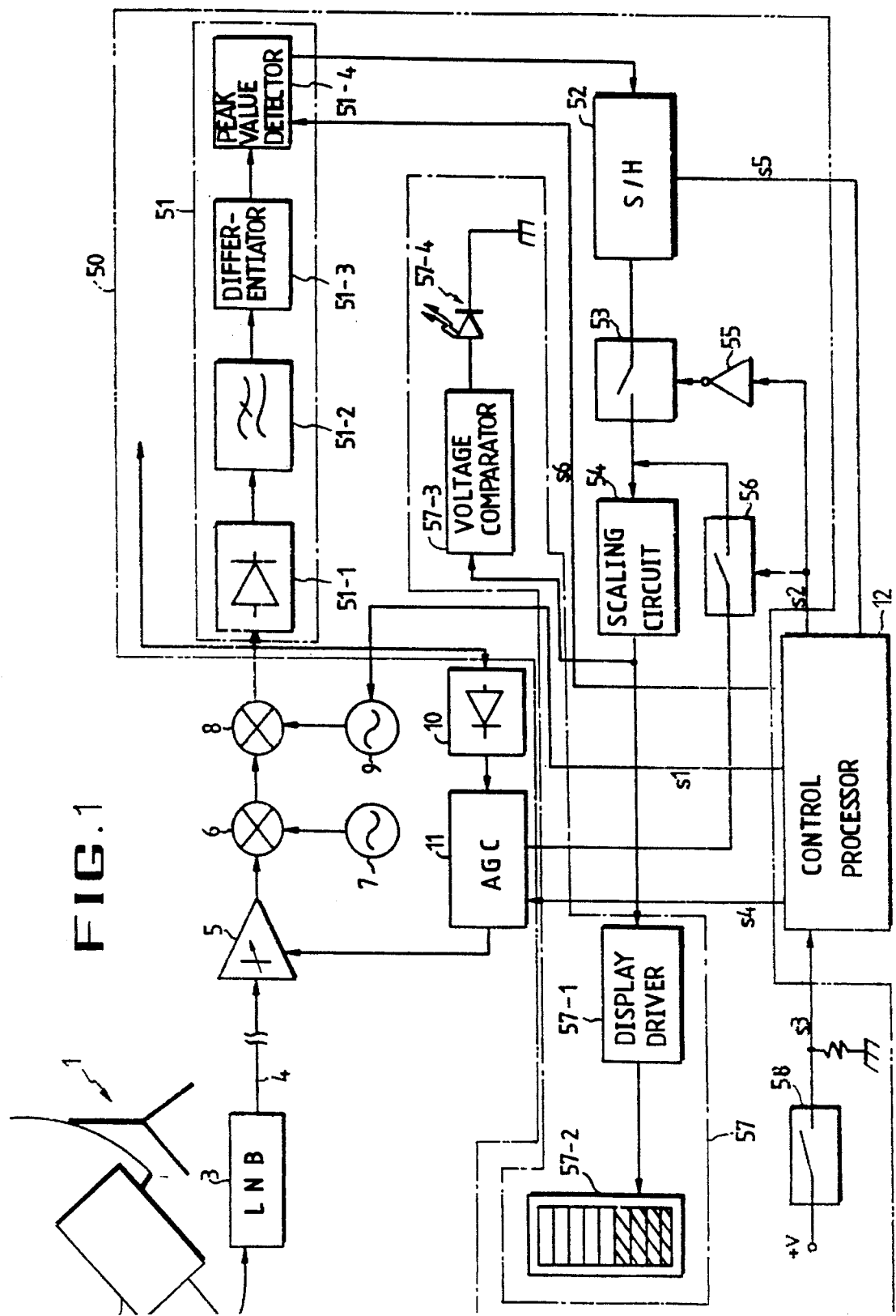

MANUAL ANTENNA ALIGNMENT APPARATUS AND METHOD FOR VERY SMALL APERTURE TERMINAL

BACKGROUND OF THE INVENTION

1. Field of the Invention

The present invention relates in general to manual antenna alignment techniques for a very small aperture terminal (VSAT), and more particularly to manual antenna alignment apparatus and method for the very small aperture terminal in which an antenna can easily be aligned with a satellite even by an unskilled man with no use of costly, additional equipment such as a special alignment device, a spectrum analyzer and etc.

2. Description of the Prior Art

Generally, an antenna is essentially used in a satellite communication system such as a very small aperture terminal to receive a feeble signal of a high frequency transmitted from a satellite. The level of the feeble signal received by the antenna depends on the linearity of the antenna and the satellite. For this reason, the antenna must accurately be aligned with the satellite to receive correct data without any noise.

The antenna used in the very small aperture terminal is very small in size. For example, such an antenna may be an offset feed type parabola antenna with a length of 1.2 m or 1.8 m.

Antenna alignment is initially performed when the very small aperture terminal is installed. Conventionally, the antenna alignment is performed by an antenna alignment expert using costly, additional equipment such as a spectrum analyzer, a special alignment device and etc.

In such a conventional antenna alignment method, a low-noise block down converter (LNB) is mounted to the antenna. An output of the low-noise block down converter is connected to the special alignment equipment or the spectrum analyzer. Under this condition, the antenna alignment expert observes the level of the signal being transmitted from the satellite, while moving a reflector of the antenna. During the observation, the antenna alignment expert adjusts the reflector of the antenna in such a manner that the maximum level signal can be received.

However, the above-mentioned conventional antenna alignment method is not economical because it requires the costly, additional equipment. Also, the antenna alignment expert must continuously observe the level of the signal being transmitted from the satellite to fix the antenna to a point that the maximum level signal is received. As a result, much time is required in aligning the antenna with the satellite.

On the other hand, a portable antenna alignment apparatus is disclosed in U.S. Pat. No. 5,019,833. The portable antenna alignment apparatus comprises a low-noise block down converter, a portable satellite television receiving antenna for receiving a television broadcasting wave signal from a satellite, an alignment device for adjusting an angle of the antenna according to a predetermined value to align the antenna with the satellite, and cover and base housing sections for containing the alignment device therein. When the antenna is not used, it is disconnected from a parabolic reflector and contained in the base housing section, which is then coupled with the cover housing section. Therefore, the user can easily carry the portable antenna alignment apparatus.

The above-mentioned conventional antenna alignment apparatus has the advantage of providing the user with convenience because it can be easily carried by the user. However, the above-mentioned conventional antenna alignment apparatus does not relate to a technique in which an inexpensive and simple circuit construction is provided in the very small aperture terminal to allow even an unskilled man to align the antenna with the satellite while observing the level of the signal being transmitted from the satellite with the naked eye and to reduce the cost resulting from the use of special and additional equipment.

SUMMARY OF THE INVENTION

Therefore, the present invention has been made in view of the above problem, and it is an object of the present invention to provide manual antenna alignment apparatus and method for a very small aperture terminal in which an inexpensive and simple circuit construction is provided so that an antenna can easily be aligned with a satellite even by an unskilled man.

In accordance with one aspect of the present invention, there is provided an apparatus for manually aligning an antenna of a very small aperture terminal with a satellite, comprising manual antenna alignment means connected between a demodulator and a data processor in a receiver for aligning the antenna with the satellite, the manual antenna alignment means including peak value detection means for filtering and differentiating an output signal from the demodulator to detect a peak value therefrom in response to a peak value detection control signal from a control processor, the detected peak value indicating a frequency position of a carrier transmitted from a center communication station; a sample/holder for sampling and holding an output signal from the peak value detection means in response to a sample/hold control signal from the control processor; an inverter for inverting a multiplexing control signal from the control processor; a first analog switch for selectively transferring an output signal from the sample/holder in an antenna alignment mode in response to an output signal from the inverter; a second analog switch for selectively transferring an output signal from an automatic gain control circuit in the receiver in a normal mode in response to the multiplexing control signal from the control processor; a scaling circuit for scaling the output signal from the sample/holder transferred by the first analog switch or the output signal from the automatic gain control circuit transferred by the second switch at a desired ratio; display means for displaying a level of an output signal from the scaling circuit so that it can be observed by the user with the naked eye; and an antenna alignment mode switch for selecting the antenna alignment mode.

In accordance with another aspect of the present invention, there is provided a method of manually aligning an antenna of a very small aperture terminal with a satellite using a manual antenna alignment circuit installed between a demodulator and a data processor in a receiver, comprising the first step of storing a manual antenna alignment control program; the second step of detecting a level of an output signal from the demodulator according to the stored manual antenna alignment control program; and the third step of allowing the user to align the antenna continuously with the satellite according to the detected signal level while observing the detected signal level and a reception sensitivity with the naked eye.

BRIEF DESCRIPTION OF THE DRAWINGS

The above and other objects, features and advantages of the present invention will be more clearly understood from the following detailed description taken in conjunction with the accompanying drawings, in which:

FIG. 1 is a block diagram illustrating the entire construction of a manual antenna alignment apparatus for a very small aperture terminal in accordance with the present invention.

DETAILED DESCRIPTION OF THE PREFERRED EMBODIMENTS

Referring to FIG. 1, there is shown, in block form, the entire construction of a manual antenna alignment apparatus for a very small aperture terminal in accordance with the present invention. As shown in this drawing, the manual antenna alignment apparatus comprises a feed horn 2 for condensing a signal from a satellite, received by an antenna 1, a low-noise block down converter 3 for low-noise amplifying an output signal from the feed horn 2 and converting the amplified signal into an intermediate frequency signal, an automatic gain amplifier 5 for maintaining the level of its output signal constantly regardless of the level of an output signal from the low-noise block down converter 3, a first local oscillator 7 for generating a first local oscillating frequency signal, and a mixer 6 for mixing the output signal from the automatic gain amplifier 5 with the first local oscillating frequency signal from the first local oscillator 7 to output a low-frequency intermediate frequency signal.

The manual antenna alignment apparatus further comprises a second local oscillator 9 for generating a second local oscillating frequency signal in response to a local oscillating frequency control signal s1 from a control processor 12, a demodulator 8 for demodulating an output signal from the mixer 6 into a desired digital signal in response to the second local oscillating frequency signal from the second local oscillator 9, a full-wave rectifier 10 for full-wave rectifying an output signal from the demodulator 8, and an automatic gain control circuit 11 for automatically controlling a gain of the automatic gain amplifier 5 in response to an automatic gain control signal s4 from the control processor 12 and an output signal from the full-wave rectifier 10 so that the output signal from the automatic gain amplifier 5 has no variation in level although the output signal from the low-noise block down converter 3 has a variation in level.

The control processor 12 is adapted to control the entire operation of the manual antenna alignment apparatus.

The manual antenna alignment apparatus further comprises a manual antenna alignment circuit 50 for aligning the antenna 1 readily with the satellite.

The manual antenna alignment circuit 50 includes a peak value detection circuit 51 for filtering and differentiating the output signal from the demodulator 8 to detect a peak value therefrom in response to a peak value detection control signal s6 from the control processor 12. The peak value detected by the peak value detection circuit 51 indicates a frequency position of a carrier transmitted from a center communication station.

The manual antenna alignment circuit 50 further includes a sample/holder 52 for sampling and holding an output signal from the peak value detection circuit 51 in response to a sample/hold control signal s5 from the control processor 12, an inverter 55 for inverting a multiplexing control signal s2 from the control processor 12, a first analog switch 53 for selectively transferring an output signal from the sample/ holder 52 in an antenna alignment mode in response to an output signal from the inverter 55, a second analog switch 56 for selectively transferring an output signal from the automatic gain control circuit 11 in a normal mode in response to the multiplexing control signal s2 from the control processor 12, a scaling circuit 54 for scaling the output signal from the sample/holder 52 transferred by the first analog switch 53 or the output signal from the automatic gain control circuit 11 transferred by the second analog switch 56 at a desired ratio, a display circuit 57 for displaying a level of an output signal from the scaling circuit 54 so that it can be observed by the user with the naked eye, and an antenna alignment mode switch 58 for selecting the antenna alignment mode.

The peak value detection circuit 51 includes a full-wave rectifier 51-1 for full-wave rectifying the output signal from the demodulator 8, a low pass filter 51-2 for low pass filtering an output signal from the full-wave rectifier 51-1 to remove a high-frequency component therefrom, a differentiator 51-3 for differentiating an output signal from the low pass filter 51-2 to obtain a mean value thereof, and a peak value detector 51-4 for detecting a peak value of an output signal from the differentiator 51-3 in response to the peak value detection control signal s6 from the control processor 12.

The signal display circuit 57 includes a signal level display unit 57-2 for displaying a relative amount regarding the level of the output signal from the scaling circuit 54, a display driver 57-1 for driving the signal level display unit 57-2, a voltage comparator 57-3 for comparing a voltage of the output signal from the scaling circuit 54 with a predetermined threshold voltage, and a light emitting diode 57-4 for indicating a reception sensitivity in response to an output signal from the voltage comparator 57-3.

The operation of the manual antenna alignment apparatus for the very small aperture terminal with the above-mentioned construction in accordance with the present invention will hereinafter be described in detail with reference to FIG. 1.

In the normal mode, when the antenna 1 receives the signal which is transmitted from the center communication station through the satellite, the received signal is condensed by the feed horn 2 and then applied to the low-noise block down converter 3. The low-noise block down converter 3 low-noise amplifies the output signal from the feed horn 2 and converts the amplified signal into the intermediate frequency signal. The low-noise block down converter 3 then transfers the intermediate frequency signal to the automatic gain amplifier 5 through an inter facility link (IFL) cable 4. The automatic gain amplifier 5 maintains the level of its output signal constantly regardless of the level of the output signal from the low-noise block down converter 3 under the control of the automatic gain control circuit 11. The mixer 6 mixes the output signal from the automatic gain amplifier 5 with the first local oscillating frequency signal from the first local oscillator 7. As a result, the mixer 6 outputs the intermediate frequency signal to the demodulator 8, which has a frequency lower than that of the output signal from the low-noise block down converter 3. The demodulator 8 demodulates the output signal from the mixer 6 into the desired digital signal in response to the second local oscillating frequency signal from the second local oscillator 9. The demodulator 8 then provides its output signal to a data processor (not shown), the full-wave rectifier 10 and the manual antenna alignment circuit 50.

While the received signal is demodulated into the digital data through the above-mentioned sequential procedures, the signal reception may not be performed well because of wave scattering, wave distortion, antenna alignment error or other conditions. In this case, the manual antenna alignment circuit 50 is operated to align the antenna 1 with the satellite, as will hereinafter described in detail.

The antenna alignment mode switch 58 is turned on to change a present mode to the antenna alignment mode. Upon being turned on, the antenna alignment mode switch 58 generates an antenna alignment ON signal s3 indicative of the antenna alignment mode. The antenna alignment mode switch 58 then outputs the antenna alignment ON signal s3 to the control processor 12. In response to the antenna alignment ON signal s3 from the antenna alignment mode switch 58, the control processor 12 changes the present mode to the antenna alignment mode and controls the associated components of the manual antenna alignment apparatus. First, the control processor 12 outputs the automatic gain control signal s4 to the automatic gain control circuit 11 to fix the gain of the automatic gain amplifier 5. In response to the automatic gain control signal s4 from the control processor 12, the automatic gain control circuit 11 is disabled to fix the gain of the automatic gain amplifier 5. Then, the control processor 12 outputs the multiplexing control signal s2 to the first and second analog switches 53 and 56 so that the output signal from the sample/holder 52 can be displayed by the signal level display unit 57-2.

The first analog switch 53 is turned on in response to the output signal from the inverter 55 which inverts the multiplexing control signal s2 from the control processor 12. The second analog switch 56 is turned off in response to the multiplexing control signal s2 from the control processor 12. Upon being turned off, the second analog switch 56 blocks the input of the output signal from the automatic gain control circuit 11.

Then, the control processor 12 outputs the local oscillating frequency control signal s1 to the second local oscillator 9. In response to the local oscillating frequency control signal s1 from the control processor 12, the second local oscillator 9 generates the second local oscillating frequency signal which is swept periodically at a desired interval. During each sweep interval, the demodulated signal from the demodulator 8 is applied to the peak value detection circuit 51. In the peak value detection circuit 51, the demodulated signal from the demodulator 8 is full-wave rectified by the full-wave rectifier 51-1 and then low pass filtered by the low pass filter 51-2. Noticeably, the second local oscillator 9 sweeps a frequency region in which the signal transmitted from the center communication station is present. In this connection, a peak value of the output signal from the low pass filter 51-2 indicates the frequency position of the carrier transmitted from the center communication station.

The differentiator 51-3 differentiates the output signal from the low pass filter 51-2 to obtain the mean value thereof. Noticeably, a peak value of the signal received by the antenna 1 is proportioned to a gradient thereof regardless of a noise floor which is determined by the low-noise block down converter 3, since the sweep operation of the second local oscillator 9 is constant in speed. As a result, the obtained mean value from the differentiator 51-3 is proportioned to a difference between the peak value of the received signal and the noise floor. Then, in response to the peak value detection control signal s6 from the control processor 12, the peak value detector 51-4 detects the peak value of the output signal from the differentiator 51-3 and holds the detected peak value until the corresponding sweep operation is ended. At the moment that the corresponding sweep operation is ended, the peak value detector 51-4 outputs the held peak value to the sample/holder 52. In response to the sample/hold control signal s5 from the control processor 12 which is a pulse signal of 10 ms, the sample/holder 52 samples the output signal from the peak value detection circuit 51 and holds the sampled signal for the time period that the subsequent sweep operation is performed.

The output signal from the sample/holder 52 is scaled at the desired ratio by the scaling circuit 54 and then applied to the display driver 57-1 and the voltage comparator 57-3. As soon as the sample/holder 52 performs the sampling operation, the peak value detector 51-4 discharges in response to the peak value detection control signal s6 from the control processor 12 which is a pulse signal of 10 ms. Then, the peak value detector 51-4 repeats the peak value detection operation.

Upon receiving the output signal from the scaling circuit 54, the display driver 57-1 applies the received signal to the signal level display unit 57-2, which then displays the level of the received signal in a bar graph. The voltage comparator 57-3 compares the voltage of the output signal from the scaling circuit 54 with the predetermined threshold voltage. If the voltage of the output signal from the scaling circuit 54 is higher than the predetermined threshold voltage as a result of the comparison, the voltage comparator 57-3 outputs a drive signal to the light emitting diode 57-4 to drive it. In response to the drive signal from the voltage comparator 57-3, the light emitting diode 57-4 is driven to indicate that the reception sensitivity is good.

The use of the bar graph in the signal level display unit 57-2 allows the user to accurately see a degree that the antenna 1 is aligned with the satellite.

In accordance with the present invention, even an unskilled man can readily align the antenna with the satellite through the above-mentioned procedures.

When the antenna alignment operation is completed, the antenna alignment mode switch 58 is turned off, thereby causing the control processor 12 to change the present mode to the normal mode. Then, the control processor 12 outputs the automatic gain control signal s4 to the automatic gain control circuit 11 to enable it. The control processor 12 also outputs the multiplexing control signal s2 to the first and second analog switches 53 and 56 to disable the first analog switch 53 and enable the second analog switch 56. As a result, the signal level display unit 57-2 displays a level of the output signal from the automatic gain control circuit 11 in the bar graph.

In result, although the present mode is changed from the antenna alignment mode to the normal mode, the user can try the better antenna alignment while observing the bar graph on the signal level display unit 57-2.

As apparent from the above description, according to the present invention, the inexpensive and simple manual antenna alignment circuit is provided at the demodulator in the receiver so that even a general subscriber can personally carry out the initial or subsequent antenna alignment. Therefore, the present invention has the effect of minimizing the cost resulting from the use of special and additional equipment. Also, the user can align the antenna with the satellite while observing the level of the signal being transmitted from the satellite with the naked eye. Therefore, the signal reception can accurately be performed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. An apparatus for manually aligning an antenna of a very small aperture terminal with a satellite, comprising manual antenna alignment means connected between a demodulator and a data processor in a receiver, for aligning said antenna with said satellite, said manual antenna alignment means including:

peak value detection means for filtering and differentiating an output signal from said demodulator to detect a peak value therefrom in response to a peak value detection control signal from a control processor, the detected peak value indicating a frequency position of a carrier transmitted from a center communication station;

a sample/holder for sampling and holding an output signal from said peak value detection means in response to a sample/hold control signal from said control processor;

an inverter for inverting a multiplexing control signal from said control processor;

a first analog switch for selectively transferring an output signal from said sample/holder in an antenna alignment mode in response to an output signal from said inverter;

a second analog switch for selectively transferring an output signal from an automatic gain control circuit in said receiver in a normal mode in response to the multiplexing control signal from said control processor;

a scaling circuit for scaling the output signal from said sample/holder transferred by said first analog switch or the output signal from said automatic gain control circuit transferred by said second switch at a desired ratio;

signal display means for displaying a level of an output signal from said scaling circuit so that it can be observed by the user with the naked eye; and an antenna alignment mode switch for selecting the antenna alignment mode.

2. An apparatus for manually aligning an antenna of a very small aperture terminal with a satellite, as set forth in claim 1, wherein said peak value detection means includes:

a full-wave rectifier for full-wave rectifying the output signal from said demodulator;

a low pass filter for low pass filtering an output signal from said full-wave rectifier to remove a high-frequency component therefrom;

a differentiator for differentiating an output signal from said low pass filter to obtain a mean value thereof; and a peak value detector for detecting a peak value of an output signal from said differentiator in response to the peak value detection control signal from said control processor.

3. An apparatus for manually aligning an antenna of a very small aperture terminal with a satellite, as set forth in claim 1, wherein said signal display means includes:

a signal level display unit for displaying a relative amount regarding the level of the output signal from said scaling circuit;

a display driver for driving said signal level display unit;

a voltage comparator for comparing a voltage of the output signal from said scaling circuit with a predetermined threshold voltage; and a light emitting diode for indicating a reception sensitivity in response to an output signal from said voltage comparator.

* * * * *